United States Patent [19]

Davida et al.

[11] 4,375,579
[45] Mar. 1, 1983

[54] DATABASE ENCRYPTION AND DECRYPTION CIRCUIT AND METHOD USING SUBKEYS

[75] Inventors: George I. Davida, Whitefish Bay; David L. Wells, Milwaukee, both of Wis.; John B. Kam, New York, N.Y.

[73] Assignee: Wisconsin Alumni Research Foundation, Madison, Wis.

[21] Appl. No.: 117,140

[22] Filed: Jan. 30, 1980

[51] Int. Cl.³ .............................................. H04L 9/00
[52] U.S. Cl. .................................................. 178/22.10
[58] Field of Search ...................................... 178/22.10

[56] References Cited

PUBLICATIONS

"A Database Encryption System with Subkeys", Davida, Wells & Kam, Aug. 1978, NSF Report TR-C-S-78-8, Univ. of Wisconsin, Dept. of E.E. and Computer Science, Milwaukee, Wis. 53201; Revised May 1979, TR CS-78-8.
"A Multiple Destination Cryptosystem for Broadcast Networks", Lee et al., Comsat Technical Review, vol. 9, No. 1, Spring '79, pp. 25-35.
"Some Cryptographic Techniques for Machine to Machine Data Communications", Feistel et al., Proceedings of the IEEE, vol. 63, No. 11, Nov. 1975, pp. 1545-1554.

*Primary Examiner*—Sal Cangialosi
*Attorney, Agent, or Firm*—Howard W. Bremer; Robert W. Cook

[57] ABSTRACT

An encryption and decryption circuit and method using subkeys which is therefore particularly useful for the encryption and decryption of database information. Each data field has a corresponding write key and a different read key. A database record is encrypted by multiplying each field by its corresponding write key and adding up all such products modulo the product of all read keys. The read keys must be prime numbers and the write keys must satisfy a certain relationship with respect to the read keys. A database record may have a single field decrypted by dividing the encrypted record by the read key for that field and taking the remainder. The security of each field may thereby be individually controlled without compromising the security of the entire record.

2 Claims, 3 Drawing Figures

DATABASE ENCRYPTION AND DECRYPTION CIRCUIT AND METHOD USING SUBKEYS

The Government has rights in this invention pursuant to Grant No. MCS-77-02156 and IPA No. 0001 awarded by the National Science Foundation.

BACKGROUND OF THE INVENTION

This invention relates to the secure storage of digital data in a memory and more particularly to a circuit and method for data base encryption and decryption using subkeys.

When data is stored in a memory where access exists by parties who do not have a justifiable need for the data, it is necessary to take some steps to insure the security of that information stored in the memory. In the past most data was stored in files, each file being owned by one single user who therefore took responsibility for restricting access to that file perhaps by such simple measures as taking a tape or disk pack with him physically after his job was run. Today there is much emphasis placed upon the data base concept whereby individual users' files are combined into one common data base in order to achieve certain efficiencies by reducing the amount of redundant information kept by different users. The data base concept, while offering certain efficiencies in terms of reduction of redundancy, has also raised a significant problem in terms of the security of various portions of the data base which are the sole property of one user but which are now more susceptible to being accessed by other users than they would have been in the days when each user had his own distinct file. These problems have given rise to an interest in data base encryption and decryption. Since there is a previously existing body of information about encryption and decryption of information which is passed over communication channels, it is natural to look at such techniques and investigate their application to the data base situation. There are basically two different kinds of encryption schemes used over a communication channel namely stream ciphers and block ciphers. Stream ciphers, as the term implies, are used for enciphering a serial bit by bit stream of data without particular concern for the length of that stream of data. Block ciphers on the other hand are used for encyphering data which comes in certain fixed word sizes where a word is a certain number of binary bits grouped together. Stream ciphers are not generally relevant to the data base encryption problem; however, block ciphers most certainly are.

Using a block cipher scheme the entire data record, or individual words or fields of that data record, may be encyphered by means of any of the existing block cipher schemes. Certain weaknesses appear however, especially in the case of a data base which is shared by multiple users. If a simple block cipher scheme is used, a number of cryptanalysis techniques are available which create troublesome problems for the user and opportunities for the unauthorized party who desires either access to the information or who wishes to tamper with the information so as to create difficult to diagnose problems. One cryptanalysis technique involves determining both the plaintext and encrypted version of one particular value of a given field which is encyphered using the block cipher scheme. There are a number of techniques which the cryptanalyst might use to obtain this kind of information and, once it is obtained, it becomes a very powerful tool in the development of solutions to the block cypher. Another weakness of the block cipher scheme is that each different plaintext value for a given field has one and only one encrypted value and therefore if one desires to alter the data base for some particular purpose, for example, to increase one's salary, it is only necessary to determine the encrypted value of the data field desired to be substituted and then perform the substitution. In this manner the database may be tampered with with very limited information about the block cipher scheme and without any detection of the tampering. Since in a block cipher scheme one plaintext value has one and only one encrypted value corresponding to it, it is possible, with certain limited statistical information about the plaintext values and encrypted values to do a statistical analysis of the data base and obtain certain valuable information thereby.

It is apparent then that it would be desirable to encrypt the entire record rather than the individual fields in order to prevent certain of the problems mentioned above, however, if one encrypts the entire record using one encryption scheme it appears then that each one of several users each having a need for only a limited subset of the record would need to have access to the entire decryption scheme in order to get access to his individual record.

It is an object of this invention to design a circuit and method for data base encryption and decryption with subkeys such that each user has an individual write key and an individual read key and the entire data base records are encrypted such that the encrypted record is a function of all fields of the record.

It is a further object of this invention to design a circuit and method for data base encryption and decryption with subkeys such that a random number is included with the plaintext data thereby yielding two different encrypted data records even if the same plaintext data is used for them.

It is a further object of this invention to design a data base encryption and decryption circuit and method with subkeys such that a signature may be included with each data base field thereby allowing the user to verify the fact that each encrypted data field was generated by him rather than being the result of tampering by an unauthorized user.

SUMMARY OF THE INVENTION

In accordance with the present invention a method for encryption of a data record comprising a number of fields and for decryption of any given field from the encrypted record comprises a number of steps. The first step involves choosing a set of read keys, di, such that each read key is a prime number and a set of write keys, ei, such that each write key is related to the corresponding read key by the following relationship, where D is the product of all read keys: $e_i = 1$ modulo $d_i$ and $e_i = 0$ modulo $d_j$ for all $j \neq i$. The next step involves multiplying each data field by the corresponding write key field. The next step involves summing all of the intermediate products from the second step modulo D yielding the encrypted version of the entire data record. This encrypted version may then be stored in a memory and any given field may be decrypted by a user by simply dividing the encrypted version of the data record by the read key corresponding to the desired field and using the remainder as the plaintext value of the desired field.

BRIEF DESCRIPTION OF THE DRAWING

A data base encryption and decryption method and circuit with subkeys according to this invention will be better understood from a consideration of the detailed description of the organization and operation of one illustrative embodiment thereof which follows when taken in conjunction with the accompanying drawings, in which.

DETAILED DESCRIPTION

Figure 1:
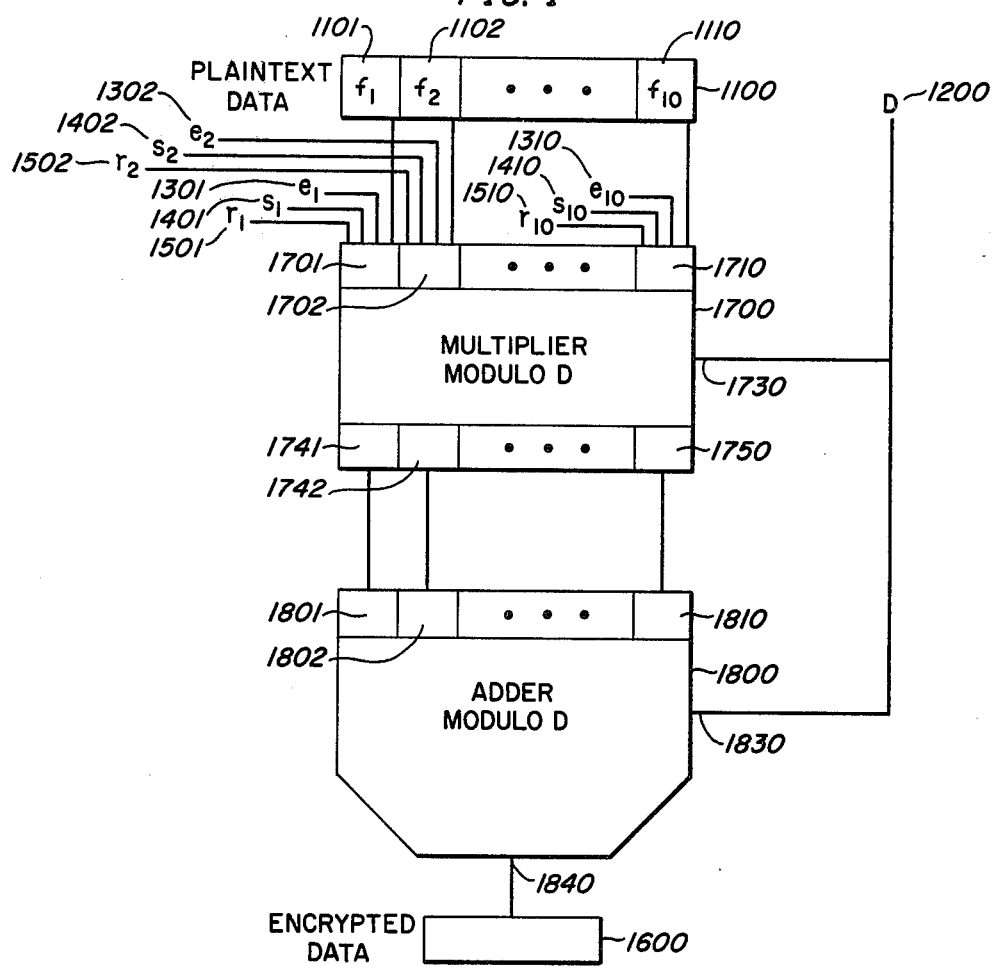
FIG. 1 depicts an exemplary database encryption circuit according to the invention.

One illustrative database encryption and decryption system with subkeys according to the invention is shown in FIG. 1 comprising a plaintext data record register 1100 which receives the plaintext data record information that is to be encrypted from any desired source of information, a read key product input 1200, write key inputs 1301 through 1310, signature inputs 1401 through 1410, random number inputs 1501 through 1510, and an encrypted data register 1600 for holding the encrypted result produced as a result of the operation of the entire circuit as will be explained in the following. The plaintext data held in register 1100 is comprised of a number of fields shown in FIG. 1 as f1 through f10. Plaintext data field f1 is stored in input buffer 1101 which is part of register 1100. Plaintext data fields f2 through f10 are stored in input buffers 1102 through 1110, which input buffers are each a part of plaintext data record register 1100. One entire plaintext data record comprises all of the information retained about a particular corresponding physical entity or transaction. Each individual plaintext data field corresponds to one particular attribute of the physical entity or transaction represented by the entire plaintext data record. One example of a plaintext data record might be an accounting transaction, for example the purchase of certain goods. One example of a plaintext data record field might be the cost of the goods which were purchased. Since different users of the data may have the need or justifiable right to use only a selected portion of the fields comprising each record it is desirable to be able to allow selective access to fields to different users. Each plaintext data field therefore has associated with it three additional inputs which are used in the encryption process. For example, plaintext data field f1 has associated with it a write key input e1, 1301, a signature input s1, 1401, and a random number input r1, 1501. Plaintext data fields f2 through f10 have corresponding write key inputs e2 through e10, 1302 through 1310, corresponding signature inputs s2 through s10, 1402 through 1410, and corresponding random number inputs r2 through r10, 1502 through 1510 associated with them. A multiplier modulo D circuit 1700 comprises an input buffer section 1701 which further comprises inputs for receiving and storing data from input buffer 1101, write key input e1, 1301, signature s1, 1401, and random number input r1, 1501, and data storage means for storing data received from each such input. The multiplier modulo D, 1700, further comprises input buffer sections 1702 through 1710 each of which comprises a corresponding plaintext data input, a corresponding write key input, a corresponding signature input, a corresponding random number input, and a data storage means for storing all of the data received on the corresponding inputs. Multiplier modulo D, 1700, further comprises an input 1730 which is connected to the product of all read keys input, 1200. The product of all read keys which is present on input 1730 of multiplier modulo D, 1700, is represented by the symbol D which is used in the name of the entire multiplier modulo D circuit, 1700. The multiplier modulo D circuit, 1700, further comprises an output buffer 1741 which is used to hold the result of the multiplication of write key e1 by the concatenation of plaintext data field f1, 1301, with signature s1, 1401, with random number r1, 1501. The multiplication is done modulo D and the result is stored in output buffer 1741. Output buffers 1742 through 1750 are used to store the product modulo D of corresponding plaintext data fields with the concatenation of the corresponding write key with the corresponding signature with the corresponding random number input.

the multiplier modulo D, 1700, may be implemented in a large variety of different configurations all of which are well known in the art and may be designed and constructed according to the particular design goals of the given encryption system by one of ordinary skill in the art. One example of such design and implementation considerations is whether the several multiplication operations, as in the example of FIG. 1, are carried out each by a separate multiplication circuit operating in parallel with each other or whether the several multiplication operations are performed by one multiplication circuit which is connected to the several different sets of inputs and outputs in a time sequential fashion in order to allow one multiplication circuit to perform all of the multiplications required. Another design consideration would be the question of how many fields the plaintext data record would be allowed to have and therefore how many buffers and multiplier circuits are necessary in order to implement the encryption circuit. A further design consideration would be the number of bits comprising each plaintext data record field which would determine the size of the registers and buffer sections used to hold the plaintext data record fields as well as the required number of bits necessary to represent the write keys e1 through e10. The number of bits allowed for each plaintext data record field will also determine the number of bits of each product which the multiplier modulo D circuit, 1700, is required to receive as inputs to the multiplication process. It should be noted that it is well known in the art to design multiplier circuits of unlimited size by the use of a number of different methods which may optimize different design criteria, for example, the amount of hardware circuitry or the time necessary to complete the final product once the inputs are applied to the multiplier circuit.

An adder modulo D circuit, 1800, comprises an input buffer section 1801, which input buffer section further comprises an input connected to the output of output buffer 1741 and storage means for storing the data received from output buffer 1741. The adder modulo D circuit, 1800, further comprises input buffer sections 1802 through 1810, each of which comprises an input connected to output buffers 1742 through 1750 correspondingly and a data storage means for storing the data received from output buffer sections 1742 through 1750 correspondingly. The adder modulo D circuit, 1800, further comprises an input 1830 for receiving the number D from input 1200 in order to allow the addition carried on within adder modulo D circuit, 1800, to be performed modulo D. The adder modulo D circuit, 1800, further comprises an output 1840 which is connected to the input of the encrypted data register 1600. The adder modulo D circuit, 1800, further comprises addition circuitry for performing the summation of the data contained in input buffer section 1801 through 1810, modulo D. The addition or summation function performed by adder modulo D circuit, 1800, may be performed in a number of different ways according to the particular design goals of the particular implementation of this data base encryption and decryption circuit. For example, it is well known in the art, to either use a number of adder circuits arranged in a tree-like fashion to perform the summation of several numbers in parallel or to use a single adder circuit to perform the summation of several numbers by using it repetitively once for each such number to add that number to the previously accummulated sum. Whether one of these two methods or one of a great variety of other well known additional methods would be used to implement the adder modulo D circuit, 1800, would be a design consideration which could be decided and implemented by one of ordinary skill in the art. After the adder modulo D circuit, 1800, has performed the addition modulo D of the data contained in input buffer sections 1801 through 1810 the result is presented at output 1840 which is connected to the input of the encrypted data register 1600 which then receives the final encrypted data version of the plaintext data record which was originally placed in plaintext data register 1100. The encrypted data may then be stored in a general purpose memory and will be secure against attempts to obtain that data by unauthorized parties who do not have the required read key.

Figure 2:
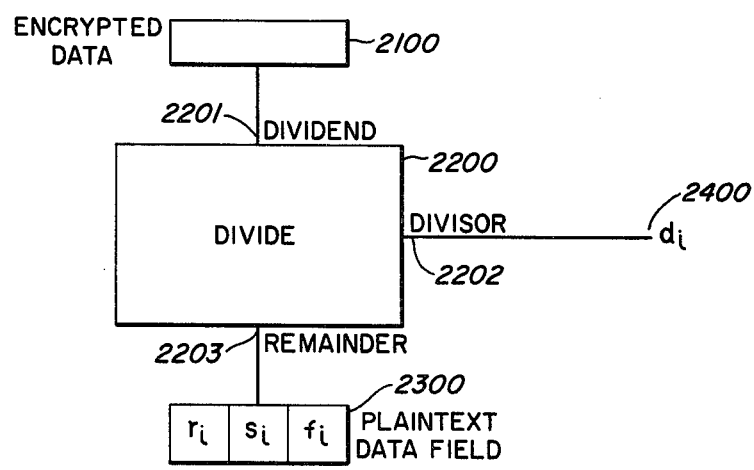
FIG. 2 depicts an exemplary database decryption circuit according to the invention.

In order for information stored in a memory to be of any value one must be able to retrieve it and in the case of encrypted data one must be able to decrypt it. A decryption circuit is shown in FIG. 2 as comprising an encrypted data register 2100, for storing the encrypted form of the entire plaintext data record, a divide circuit 2200, a plaintext data field register 2300, for storing the decrypted form of one field of the plaintext data record and its associated signature and random number, and a read key input 2400 for presenting to the decryption circuit the read key associated with the particular plaintext data field to be decrypted from the encrypted data which is presented at encrypted data register 2100. Divide circuit 2200 further comprises a dividend input 2201 connected to the output of encrypted data register 2100. Dividend input 2201 receives the encrypted data representing the encrypted version of the entire plaintext data record. Divide circuit 2202 further comprises a divisor input 2202 connected to read key input 2400. The divisor input 2202 receives the key which must be divided into the encrypted data in order to determine the desired plaintext data field. Divide circuit 2200 further comprises a remainder output 2203 which is connected to the input of plaintext data field register 2300. Divide circuit 2200 further comprises circuitry for performing a division of the data present on the dividend input 2201 by the data present on the divisor input 2202 yielding a quotient and a remainder, which remainder is presented at remainder output 2203 and thereby placed in plaintext data field register 2300. The data placed in plaintext data field register 2300 is the concatenation of the plaintext data field with the signature with the random number corresponding to the field corresponding to the read key present on read key input 2400. Therefore it is necessary to use only a portion of the information present in plaintext data field register 2300, that portion depending upon whether the user is interested in only the data field or the data field and signature.

It is necessary that the write and read keys for each field meet certain criteria. First the read keys must be prime numbers. The read keys must be larger than the maximum value which will be allowed in the corresponding data field. The product of all of the read keys is refered to as D, where the individual read keys are refered to as di for i=1 to the maximum number of data fields per record. The write keys, ei, are calculated according to the relationship ei=(D/di)bi where bi=((D/di) raised to the (di-2)power) modulo di. These relationships conform to the requirements of a modified form of the Chinese Remainder Theorm, where di's are required to be prime. The Chinese Remainder Theorem is known in the area of number theory.

In the above description it has been indicated that a number of design options are available to a person of ordinary skill in the art in order to implement a data base encryption and decryption system with subkeys according to this invention. In the following, one particular example of an implementation of a data base encryption system is shown as FIG. 3. It should be understood that this does not exclude the many variations which may be implemented by a person of oridnary skill in the art but is rather one specific example to show in more detail how such a data base encryption system may be implemented.

The illustrative data base encryptions and decryption system with subkeys shown in FIG. 3 comprises a data in bus 3000, a data out bus 3120, a control input bus 3200, a status out bus 3300, and control and data circuits for performing data base encryption and decryption as described in the following. The busses 3000, 3120, 3200 and 3300 provide a communication path for control and data signals to pass between the data base encryption and decryption circuit and any other circuit connected to it in order to use it for encryption and decryption.

A number of registers, each comprised of a number of flip flops, as is well known in the art, are connected by means of input gates to the data input bus 3000. Register E, 3010, is connected to the data in bus 3000 by means of an input gate 3011. Register E, 3010, is used for holding the write key for a given field. The circuit shown in FIG. 3 operates in a serial fashion whereby one plaintext data field is presented at a time to the data base encryption system. Register F, 3020, is connected to data in bus 3000, by means of input gate 3021. A control input number 2, 3002, is connected to a second input of input gate 3021. Register F, 3020, is used to hold the particular data field which is to be encrypted. A register S, 3030, is connected to data in bus 3000 by means of a input gate 3031. Control input 1, 3032, is connected to a second input of input gate 3031 in order to control the time at which information is gated from data in bus 3000 to register S, 3030. Register S, 3030, is used to a hold a signature which is a data field chosen by the user to identify the fact that he generated this particular data field. If an unauthorized user tampered with the data in an encrypted data record the fact that the data has been tampered with may be detected by observing the signature field which will be changed as a result of any change in any portion of the encrypted data record. A random number generator, 3040, is used to generate a random number at its output, 3041, which is gated into a register R, 3050, by means of an input gate 3051, which input gate 3051 has one of its inputs connected to the output 3041 of random number generator 3040 and its output connected to the input of register R, 3050. A control signal 1, 3052, is connected to a second input of control gate 3051 in order to allow random numbers to be gated into register R, 3050, only when desired. A register D, 3060, is connected to data in bus 3000 by means of an input gate 3061. A control input number 4, 3062, is connected to a second input of input gate 3061, in order to control the gating of data into register D, 3060, at the appropriate time. A multiplier modulo D circuit, 3070, comprises a first data input 3071 connected to the output of register E, 3010, whereby the write key contained in register E, 3010, is used as one of the data elements to be multiplied. the multiplier modulo D circuit, 3070, further comprises a second input, 3072, connected to the concatenation of register F, 3020, with register S, 3030, with register R, 3050. Input 3072 is the second data input of multiplier circuit modulo D, 3070. Multiplier modulo D circuit, 3070, further comprises an input 3073 connected to the output of register D, 3060, whereby the number D, which represents the modulus is presented to the multiplier circuit modulo D, 3070. The output of multiplier molulo D, 3070, is connected to a register G, 3080, by means of a control gate 3081. A control input number 5, 3082, is connected to a second input of control gate 3081 in order to control the gating of the output of multiplier modulo D circuit, 3070, into register D, 3080, at the appropriate time.

An adder circuit modulo D, 3090, comprises a first input 3091 connected to the output of register G, 3080, whereby the output of multiplier modulo D circuit, 3070, may be accumulated by means of adder circuit modulo D, 3090. A second input, 3092, of adder circuit modulo D, 3090, is connected to the output of a register B, 3100. Register B, 3100, further comprises an input 3101 connected to the data in bus 3000 by means of a input gate 3102. A control input number 9, 3103, is connected to a second input of control gate 3102 in order to control the gating of data from data in bus 3000 to register B, 3100, at the appropriate time. An input 3093 to adder circuit modulo D, 3090, is connected to the output of register D, 3060, whereby the number D corresponding to the modulus for adder circuit modulo D, 3090, is connected to adder circuit modulo D, 3090. The output of adder circuit modulo D, 3090, is connected an input of register T, 3110, whereby the sum of the data in register B, 3100, and in register G, 3080, is gated to register T, 3110, by means of an input gate 3111 connected to the output of adder circuit modulo D, 3090. A control input number 6, 3112, is connected to a second input of control gate 3111, in order to control the gating of the sum modulo D into register T, 3110, at the appropriate time. The output of register T, 3110, is gated to the data out bus 3120 by means of an input gate 3121 connected to the output of register T, 3110. A control input number 9, 3122, is connected to a second input of input control gate 3121 in order to control the gating of the data present in register T, 3110, to the data out bus 3120 at the appropriate time. The output of register T, 3110, is also gated to the input of register B, 3100, by means of an input gate 3105 which is connected to the output of register T, 3110. A control input number 7, 3106, is connected to a second input of input gate 3105 in order to control the gating of data from register T, 3110, to register B, 3100, at the appropriate time.

A control register C, 3210, is connected to the control input bus 3200 by means of an input gate 3211. A control bus strobe signal 3212, which indicates when valid information is available on the control input bus, is connected to a second input of input gate 3211 such that control information placed on control input bus 3200 will be gated into control register C, 3210, at the appropriate time. An increment input to control register C, 3210, is connected to an AND gate 3213. One input of AND gate 3213 is connected to an internal clock signal 3214 which is used to synchronize the various operations performed within the entire data base encryption circuit shown in FIG. 3. A second input of AND gate 3213 is connected to the output of an inverter gate 3215. The input of inverter gate 3215 is connected to the output of an OR gate 3216. A first input of OR gate 3216 is connected to a control signal number 8, 3217 and a second input of OR gate 3216 is connected to a control signal number 10, 3218. Gates 3213, 3215, and 3216 function to allow the internal clock to increment control register C, 3210, during each internal clock period until either control state 8 or control state 10 occurs at which time further incrementing of control register C, 3210, is prevented. The output of control register C, 3210, is connected to an input of a decoder circuit 3230. Decoder circuit 3230 further comprises a number of outputs and means for activating (presenting a binary 1 signal) at one and only one of such outputs at any given time. The particular active output of decoder 3230 corresponds to the binary encoded data presented to the input of decoder 3230 by control register C, 3210. The function of the different control signal outputs from decoder 3230 will be described in more detail in the illustrative operation description which follows. The control signal outputs of decoder 3230 are gated to the status output bus 3300 by means of an input gate 3240. A status strobe signal 3241 is connected to a second input of input gate 3240 such that the status information from the control signal outputs of decoder 3230 are placed on status out bus 3300 at the appropriate time as determined by the presence of the status strobe signal 3241.

Figure 3:
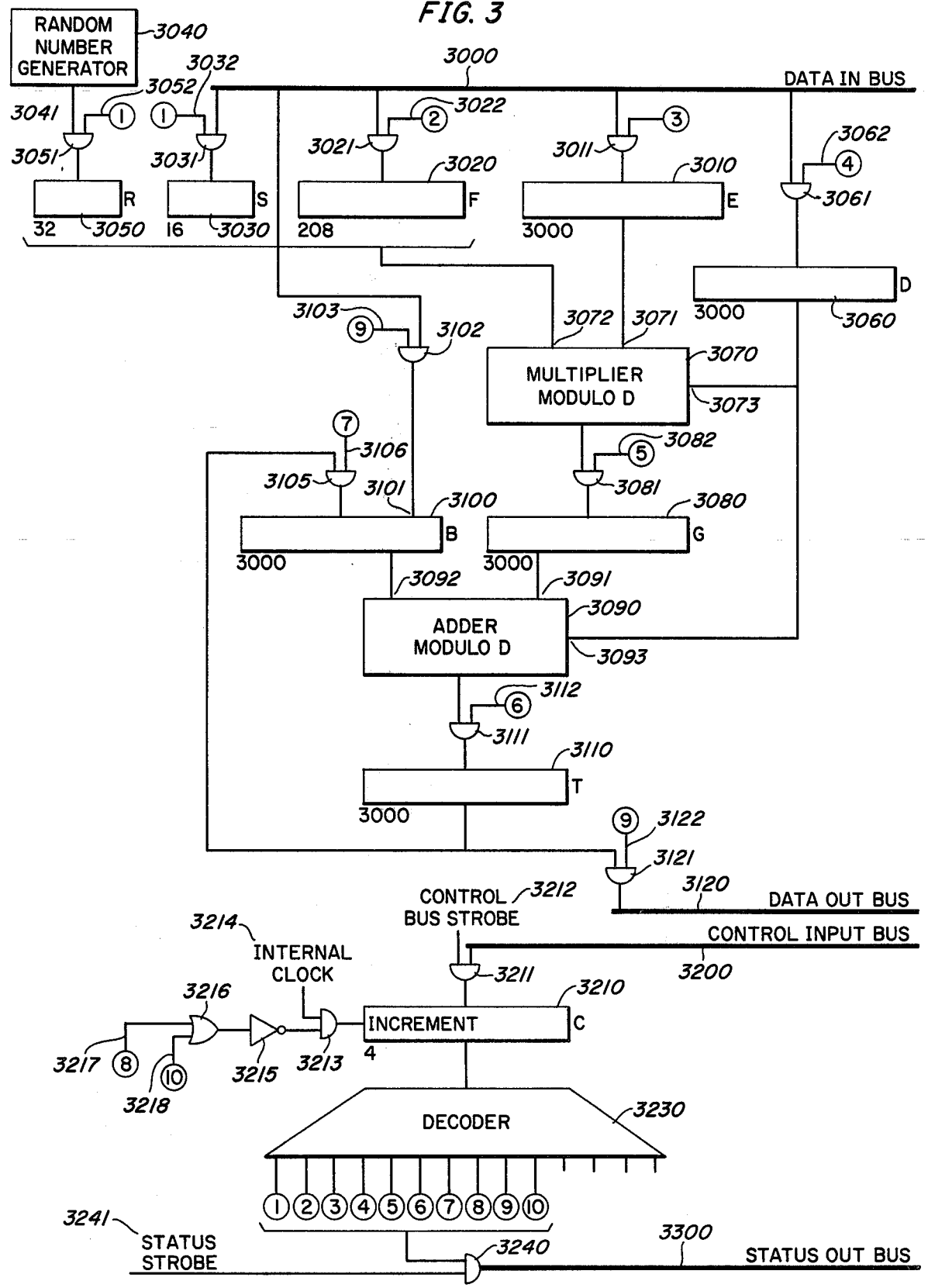
FIG. 3 depicts an exemplary data base encryption circuit according to the invention in more specific detail than the circuit shown in FIG. 1.

For illustrative purposes, register sizes in binary bits have been chosen for each of the registers shown in FIG. 3. Register D, 3060, is shown as being 3000 bits wide in order to allow 10 different 256 bit combined data fields to be encrypted into the final encrypted data word. Register E, 3010, is also shown as 3000 bits wide since it must be the same width in binary bits as register D, 3060. The combination of register F, 3020, register S, 3030, and register R, 3050, is shown as being 256 bits. Register R, 3050, is shown as 32 bits wide, register S, 3030, is shown as 16 bits wide, and register F, 3020, is shown as 208 bits wide. Register G, 3080, register B, 3100, and register T, 3110, are all shown as 3000 bits wide in order to hold the intermediate products and sums as well as the final encrypted data field modulo D which is 3000 bits wide in this illustrative example. Control register C, 3210, is shown as 4 bits wide since that would provide a sufficient number of binary combinations to encode the 9 different control states shown in this illustrative example.

An illustrative operation of the data base encryption system may now be considered. The operation of the data base encryption system according to the example described herein begins with the application of the binary number 9 presented on control input bus 3200 in combination with a control bus strobe signal presented on input 3212. A combination of these input signals results in the binary number 9 being placed in control register C, 3210, and output 9 of decoder 3230 being activated. At this same time, data comprising all zeroes must be placed on data in bus 3000 so that all zeroes will be gated into register B, 3100, by means of control signal 9 being applied to input 3103 of input gate 3102 and thereby gating zeroes into register B, 3100. During normal operation the function of gating zeroes into register B, 3100, in order to clear out the partial sum contained therein will be performed at the same time that the final result is gated onto the data out bus, however during the first operation it would be desirable to perform this gating out operation in order to be assured that register B, 3100, does indeed have all zeroes in it before beginning the encryption operation.

The following will now describe the normal sequence in the operation of the example of the data base encryption system. The operation would begin with the presentation of the binary number 1 on control input bus 3200 in coincidence with a control bus strobe presented on input 3212 and signature data presented on data in bus 3000. The binary number 1 will thereby be gated into control register C, 3210, by means of input gate 3211. The presence of a binary 1 in control register C, 3210, will cause the binary 1 to be presented to the input of decoder 3230 and thereby control output 1 of decoder 3230 will be activated. Control output 1 of decoder 3230 will cause two input gates to be activated by means of input lines 3052 and 3032. Control input 3052 allows input gate 3051 to load a random number from random number generator 3040 into register R, 3050. Control input 3032 allows input gate 3031 to gate the signature input present on data in bus 3000 to be gated into register S, 3030. The next internal clock signal present on input 3214 of gate 3213 will cause control register C, 3210, to be incremented from a binary 1 to a binary 2 and thereby control output 2 of decoder 3230 will be activated. Control output 2 of decoder 3230 is connected to a control input of input gate 3021 by means of input 3022 whereby the plaintext data record field information which must be present on data input bus 3000 at this time is gated into register F, 3020. During the next internal clock cycle the contents of register C, 3210, are incremented to a binary 3 which causes control output 3 of decoder 3230 to be activated thereby activating input gate 3011 and gating write key data for the field currently being encrypted which must be present on data in bus 3000 at this time to be gated into register E, 3010. During the next internal clock cycle control register C, 3210, is incremented to a binary 4 thereby causing control output 4 of decoder 3230 to be activated which in turn activates control input 3062 of input gate 3061 which causes write key product data which must be present on input bus 3000 at this time to be gated into register B, 3060. The next internal clock signal causes register C, 3210, to be incremented to a binary 5 thereby causing control output 5 of decoder 3230 to be activated whereby control input 3082 of input gate 3011 is activated causing the output of multiplier circuit modulo D, 3070, to be gated into register G, 3080. The next internal clock signal causes control register D, 3210, to be incremented to a binary 6 thereby causing control output 6 at decoder 3230 to be activated which in turn causes control input 3112 of input gate 3111 to be activated whereby the sum molulo D of the contents of register B, 3100, and register G, 3080, which is present at the output of adder circuit modulo D, 3090, to be gated into register T, 3110. The next internal clock signal causes control register C, 3210, to be incremented to binary 7 thereby causing control output 7 of decoder 3230 to be activated whereby control input 3106 of input gate 3105 is activated allowing the output of register T, 3110, to be gated into register B, 3100. Register B, 3100, now contains the updated partial sum modulo D of the product of write keys and data fields. The next internal clock signal causes control register C, 3210, to be incremented to a binary 8 thereby causing control output 8 of decoder 3230 to be activated thereby causing input 3217 of OR gate 3216 to be activated causing a 1 output to be present on the output of 3216 and a 0 output to be present on the output of inverter gate 3215 whereby AND gate 3213 is prevented from allowing further internal clock signals to increment control register C, 3210. The data base encryption system will remain in control state 8 until a new control input is presented on control input bus 3200 and control bus strobe is presented on input 3212. The operation which has just been described has caused one data field of the plaintext data record to be encrypted and accumulated modulo D. The same operation must be carried out for each data field in the plaintext data record, except of course that the initial use of control state 9 to clear register B, 3100, must not be done or the partial sum would be cleared out.

When all data fields in the plaintext data record have been multiplied by the appropriate write key and accumulated modulo D then the final result may be obtained by placing the binary 9 on control input bus 3200 and a strobe signal on control bus strobe input 3212 whereby control output 9 of decoder 3230 is activated whereby control input 3122 of input gate 3121 is activated allowing the contents of register T, 3110 to be gated to data out bus 3120. During the same cycle, zero data must be present on data in bus 3000 in order to insure that register B, 3100, has been cleared for subsequent operations. The encrypted data field will now be present on data out bus 3120. The next internal clock signal will cause control register C, 3210, to be incremented to a binary 10 whereby control output 10 of decoder 3230 is activated thereby activating input 3218 of OR gate 3216 causing a 1 output to be present on the output of OR gate 3216 and a 0 output to be present on the output of inverter gate 3215 thereby preventing AND gate 3213 from allowing further internal clock signals on input 3214 to increment register C, 3210. Control states 8 and 10 thereby become idle states whereby the data base encryption system will remain in those states until activated by further signals on the control bus strobe input 3212 and control input bus 3200. An illustrative operation of data base decryption circuit shown in FIG. 2 will now be considered. In order to utilize the data base decryption circuit shown in FIG. 2 it is simply necessary to present the encrypted data to encrypted data register 2100 and the read key for the field, which is to be encrypted, to read key input 2400 and accept the plaintext data field present in the plaintext data field register 2300. What has been described is considered to be only one specific illustrative embodiment of the invention and it is to be understood that various other arrangements may be devised by one skilled in the art without departing from the spirit and scope thereof as defined by the accompanying claims.

We claim:

1. A method for encryption of a data record consisting of a plurality of fields, $f_i$, and for decryption of a field, $f_i$, from the encrypted record, comprising the steps of:

choosing a read key, $d_i$, and write key, $e_i$, corresponding to each field, i, such that each $d_i$ is a prime number, D is the product of all $d_i$ and each $e_i$ is chosen such that $e_i=1$ modulo $d_i$, and $e_i=0$ modulo $d_j$ for all $j \neq i$;

multiplying each of said plurality of fields by said corresponding key field, $e_i$, to yield an intermediate product;

summing all of said intermediate products modulo D to yield an encrypted version of said data record;

decrypting a field $f_i$ from said encrypted version of said data record by dividing said encrypted version of said data record by said read key $d_i$ corresponding to said field $f_i$ to yield a decrypted version of said field $f_i$;

concatenating each of said plurality of fields, $f_i$, with a randomly chosed number prior to multiplication by said corresponding key field; and removing said randomly chosen number from said decrypted version of said field $f_i$ after decryption.

2. A method for encryption of a data record consisting of a plurality of fields, $f_i$, and for decryption of a field, $f_i$, from the encrypted record, comprising the steps of:

choosing a read key, $d_i$, and write key, $e_i$, corresponding to each field, i, such that each $d_i$ is a prime number, D is the product of all $d_i$ and each $e_i$ is chosen such that $e_i=1$ modulo $d_i$, and $e_i=0$ modulo $d_j$ for all $j \neq i$;

multiplying each of said plurality of fields by said corresponding key field, $e_i$, to yield an intermediate product;

summing all of said intermediate products modulo D to yield an encrypted version of said data record;

decrypting a field $f_i$ from said encrypted version of said data record by dividing said encrypted version of said data record by said read key $d_i$ corresponding to said field $f_i$ to yield a decrypted version of said field $f_i$;

concatenating each of said plurality of fields, $f_i$, with a signature field prior to multiplication by said corresponding key field; and removing said signature field from said decrypted version of said field $f_i$ after decryption.

* * * * *